Patented Mar. 29, 1932

1,851,450

UNITED STATES PATENT OFFICE

HANS SCHMIDT, OF ELBERFELD-VOHWINKEL, GERMANY, ASSIGNOR TO WINTHROP CHEMICAL COMPANY, INC., OF NEW YORK, N. Y., A CORPORATION OF NEW YORK

STABLE SOLUTIONS OF PENTAVALENT ANTIMONY COMPOUNDS

No Drawing. Application filed November 1, 1929, Serial No. 404,217, and in Germany November 6, 1928.

The present invention relates to stable solutions of pentavalent antimony compounds.

Aqueous solutions of antimonates and of organic complex compounds of pentavalent antimony sometimes tend to become turbid on prolonged standing.

In accordance with the present invention aqueous solutions of water-soluble salts of antimonic acid with organic and inorganic bases and of complex salts of pentavalent antimony with aromatic sulfonic- and carboxylic acids containing two hydroxy groups in o-position to each other are rendered stable for a considerable time by incorporating therewith a water-soluble organic polyhydroxy compound of the group consisting of carbohydrates and of polyhydroxy alcohols containing 6 carbon atoms. As complex antimony compounds the solutions of which can be stabilized according to my invention there may be mentioned by way of example the diethylamine salt of antimonic acid, potassium pyro-antimonate, antimony V-pyrocatechin disulfonate. The complex compounds of antimony to be stablized are generally obtainable by causing antimonic acid to react with an aromatic ortho-dihydroxy sulfonate or carboxylate inaqueous solution, if desired with the addition of an alkali, such as caustic alkali, ammonia and organic bases, and finally neutralizing the solution by the addition of an alkali.

Suitable organic water-soluble polyhydroxy compounds of the above mentioned kind are, for example, cane sugar, glucose, mannite, lactose, xylose and the like. The quantity of such a polyhydroxy compound to be added to the solution of antimony compounds varies in widest limits, however, it should be taken into consideration that said quantity is subject to the requirement that the solution ready for the injection be isotonic with the liquid of the specific cellular tissue to which the solution is applied. Apparently the stability of the aqueous solutions of the antimony compounds thus obtainable is effected by a stabilizing action of the polyhydroxy compound on the complex state of the antimony compounds used.

The invention is illustrated by the following example, without being limited thereto:

3 grams of the diethylamino-ethanol salt of antimonic acid and 4 grams of glucose are dissolved together with water and made up with water to 100 ccm. The solution thus produced is stable for a long time, it can be sterilized without becoming turbid.

I claim:

1. Aqueous solutions of a compound containing antimony of the group consisting of salts of antimonic acids with organic and inorganic bases and of complex compounds of pentavalent antimony with aromatic sulfonic and carboxylic acids, containing two hydroxy groups in ortho-position to each other, said solutions characterized by the fact that they contain an organic, water-soluble polyhydroxy compound of the group consisting of carbohydrates and of polyhydroxy alcohols containing 6 carbon atoms, such compound acting as a stabilizer.

2. Aqueous solutions of a compound containing antimony of the group consisting of complex compounds of pentavalent antimony with polyhydroxy benzene sulfonic and carboxylic acids, containing two hydroxy groups in ortho-position to each other, said solutions characterized by the fact that they contain an organic, water-soluble polyhydroxy compound of the group consisting of carbohydrates and of polyhydroxy alcohols containing 6 carbon atoms, such compound acting as a stabilizer.

3. Aqueous solutions of a compound containing antimony of the group consisting of salts of antimonic acids with organic and inorganic bases and of complex compounds of pentavalent antimony with aromatic sulfonic and carboxylic acids, containing two hydroxy groups in ortho-position to each other, said solutions characterized by the fact that they contain glucose acting as a stabilizer.

4. Aqueous solutions of a compound containing antimony of the group consisting of complex compounds of pentavalent antimony with polyhydroxy benzene sulfonic and carboxylic acids, containing two hydroxy groups in ortho-position to each other, said solutions characterized by the fact that they contain glucose acting as a stabilizer.

5. Aqueous solutions of a compound containing antimony of the group consisting of salts of antimonic acids with aliphatic amines and alkali metal hydroxides, said solutions characterized by the fact that they contain glucose acting as a stabilizer.

6. Aqueous solutions of the diethyl-aminoethanol salt of antimonic acid, said solutions characterized by the fact that they contain glucose acting as a stabilizer.

In testimony whereof, I affix my signature.

HANS SCHMIDT. [L. S.]